United States Patent
King et al.

(10) Patent No.: US 7,424,555 B2
(45) Date of Patent: *Sep. 9, 2008

(54) COMPUTER ASSEMBLY

(75) Inventors: James Edward King, Wokingham (GB); Rhod James Jones, Crowthorne (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1232 days.

This patent is subject to a terminal disclaimer.

(21) Appl. No.: 10/216,541

(22) Filed: Aug. 9, 2002

(65) Prior Publication Data
US 2004/0028073 A1   Feb. 12, 2004

(51) Int. Cl.
*G06F 3/00* (2006.01)
*G06F 1/00* (2006.01)

(52) U.S. Cl. .................. 710/14; 710/8; 710/15; 710/16; 710/18; 710/19; 715/700; 713/300

(58) Field of Classification Search .......... 710/14, 710/15, 16, 18, 19
See application file for complete search history.

(56) References Cited

U.S. PATENT DOCUMENTS

| | | | | |
|---|---|---|---|---|
| 5,469,554 A | * | 11/1995 | Tucker et al. ............... | 711/210 |
| 5,864,653 A | * | 1/1999 | Tavallaei et al. ............ | 710/58 |
| 6,954,358 B2 | * | 10/2005 | King et al. .................. | 710/300 |
| 7,039,918 B2 | * | 5/2006 | Jones et al. .................. | 710/31 |
| 2002/0042896 A1 | * | 4/2002 | Johnson et al. ............ | 714/47 |
| 2003/0023887 A1 | | 1/2003 | Maciorowski et al. | |

FOREIGN PATENT DOCUMENTS

GB   2371380   7/2002

* cited by examiner

*Primary Examiner*—Alan Chen
(74) *Attorney, Agent, or Firm*—Meyertons Hood Kivlin Kowert & Goetzel, P.C.

(57) ABSTRACT

A computer system, for example for use as a server, comprises a host processor, a service processor for providing system management functions within the computer system, and a user interface for receiving external commands and data for the service processor and/or the host processor, and for sending data from the service processor and/or the host processor. A device is provided for routing the commands and data to and from the user interface via the service processor only when the device receives a signal from the service processor. In the absence of the signal, the commands and data are sent between the user interface and the console interface bypassing the service processor. By this means, the host processor may be addressed even if the service processor malfunctions.

20 Claims, 6 Drawing Sheets

COMPUTER ASSEMBLY

BACKGROUND OF THE INVENTION

This invention relates to computer systems, and especially to computer systems that are employed as servers.

The systems may for instance be employed as servers for example in local area networks (LANs) or in wide area networks (WANs), telecommunications systems or other operations such as database management or as internet servers. Such servers may be used in so-called "horizontally scaled" applications in which tens or hundreds of corresponding servers are employed as part of a distributed system.

A typical computer employed for such purposes will comprise a pair of processors mounted on a motherboard, together with power supply units (PSUs), and other components such as hard disc drives (HDDs), fans, digital video disc (DVD) players, memory modules ethernet ports etc. One or more of the processors, the host processor(s), provides the main functions of the server, and may communicate with a number of peripheral components, including communication ports, optionally via peripheral component interconnect (PCI) bridges in order to provide server operation. One of those peripheral components, called the "South Bridge" further allows the host processors to communicate with internal devices via serial interfaces one of which transports the console interface of the processors.

In addition to the host processor(s), the system may include another processor, called the service processor or the remote management controller (RMC), which provides management functions for the system assembly. Such functions may include environmental monitoring, temperature monitoring of the enclosure, fan speed control, data logging and the like.

Conventionally, some means has been needed to control communication between the user and the host processor and the service processor. In one early design of server, the service processor and the console interface of the host processor were connected to a user interface, such as a serial port, by means of a custom programmable logic device. The service processor would control the logic device and any communication between the service processor and the user interface would take precedence over communications with the console interface so that any data generated by the console when the service processor was being operated using its command line interface (CLI) would be lost. In addition, the logic device was not designed to handle a malfunction of the service processor, with the result that if the service processor were to malfunction when its CLI was being used, it would no longer be possible to communicate with the console interface.

An improvement in that system has been to employ a dual ported service processor so that all data between the console interface and the user interface is routed through the service processor. The service processor can then decide whether the data relates to the management mode of operation, in which case the data could be processed by the service processor, or whether it relates to console mode, in which case it could be routed to the console interface. In this system, if data were generated at the console interface while the system was in management mode, the data would not be lost but would be stored in memory associated with the service processor. However, because all data to or from the console is routed via the service processor, any malfunction of the service processor would prevent further communication between the user and the host processor until replacement of the service processor (although that would not necessarily prevent operation of the host processor). Depending on the location of the network server, replacement of the service processor may take days or even weeks.

SUMMARY OF THE INVENTION

According to the present invention, a device is included that can route data between the user interface and the service processor on receipt of a signal from the service processor, or otherwise route the data between the user interface and the console, bypassing the service processor. Thus, according to one aspect of the invention, there is provided a computer system which comprises:

(i) a host processor;
(ii) a service processor for providing system management functions within the computer system, the service processor being responsive to external mode switching commands to operate either in a management mode in which commands received are processed by the service processor, or in a console mode in which commands received are passed by the service processor to a console interface for processing by the host processor;
(iii) a user interface for receiving external commands and data for the service processor and/or the host processor, and for sending data from the service processor and/or the host processor; and
(iv) a device for routing the commands and data to and from the user interface via the service processor only when the device receives a signal from the service processor so that, in the absence of the signal, the commands and data are sent between the user interface and the console interface bypassing the service processor.

The system has the advantage that, under normal operation, all commands and data will be routed to the service processor which will decide whether the data relate to a system management function, or to a console function. If the data or commands relate to a console function, they will be routed to the console interface, for example via the device again. However, should the service processor fail for any reason, communication between the user interface and the host processor is not lost, but instead is automatically routed so that it bypasses the service processor.

The device may be controlled in any of a number of ways. In one embodiment the device defaults to bypassing the service processor so that, if no control signal is received for whatever reason, communication with the console interface is maintained. This may be achieved by controlling the device by means of a voltage level that is set by the service processor, and a pull-up or pull-down resistor that is connected to the output of the service processor, so that, if no voltage is received from the service processor, the control voltage for the device will rise to the appropriate voltage rail or will fall to ground. The system may, for example, include a bus that extends between the user interface and the console interface, the bus including a switch, for example in the form of a FET, whose gate is connected to the voltage level output of the service processor. In this design, the service processor holds the gate voltage to ground, thereby turning the switch off, but on failure of the service processor, the gate voltage will rise due to the pull-up resistor and the switch will be turned on.

The switch may, form part of a multiplexer, for example one based on complementary metal oxide semiconductor (CMOS) technology, in which a number of CMOS switches are held open by means of the signal from the service processor applied to the gates of the CMOS switches. Alternatively, the multiplexer may be formed from a custom programmable logic device (CPLD).

According to another aspect of the invention, there is provided a sub-assembly for a computer system, the subassembly comprising:

(i) a service processor for providing system management functions within the computer system, the service processor being responsive to external mode switching commands to operate either in a management mode in which commands received are processed by the service processor, or in a console mode in which commands received are passed by the service processor to a console interface for processing by a host processor of the system;

(ii) a user interface for receiving external commands and data for the service processor and/or the host processor, and for sending data from the service processor and/or the host processor; and (iii) a device for routing the commands and data to and from the user interface via the service processor only when the device receives a signal from the service processor so that, in the absence of the signal, the commands and data are sent between the user interface and the console interface bypassing the service processor.

According to yet another aspect, the invention provides a method of operating a computer system that includes a host processor and a service processor for providing system management functions, the method comprising sending external commands to the service processor and receiving data from the service processor via a user interface, the service processor being responsive to external mode switching commands to operate either in a management mode in which commands received are processed by the service processor, or in a console mode in which commands received are passed by the service processor to a console interface for processing by the host processor;

wherein the commands and data are routed to and from the user interface via the service processor only on receipt of a signal from the service processor so that, in the absence of the signal, the commands and data are sent between the user interface and the console interface bypassing the service processor.

BRIEF DESCRIPTION OF THE DRAWINGS

Embodiments of the present invention will now be described in detail by way of example with reference to the accompanying drawings, in which corresponding parts are given like reference numbers. In the drawings.

DESCRIPTION OF PARTICULAR EMBODIMENTS

Figure 1:
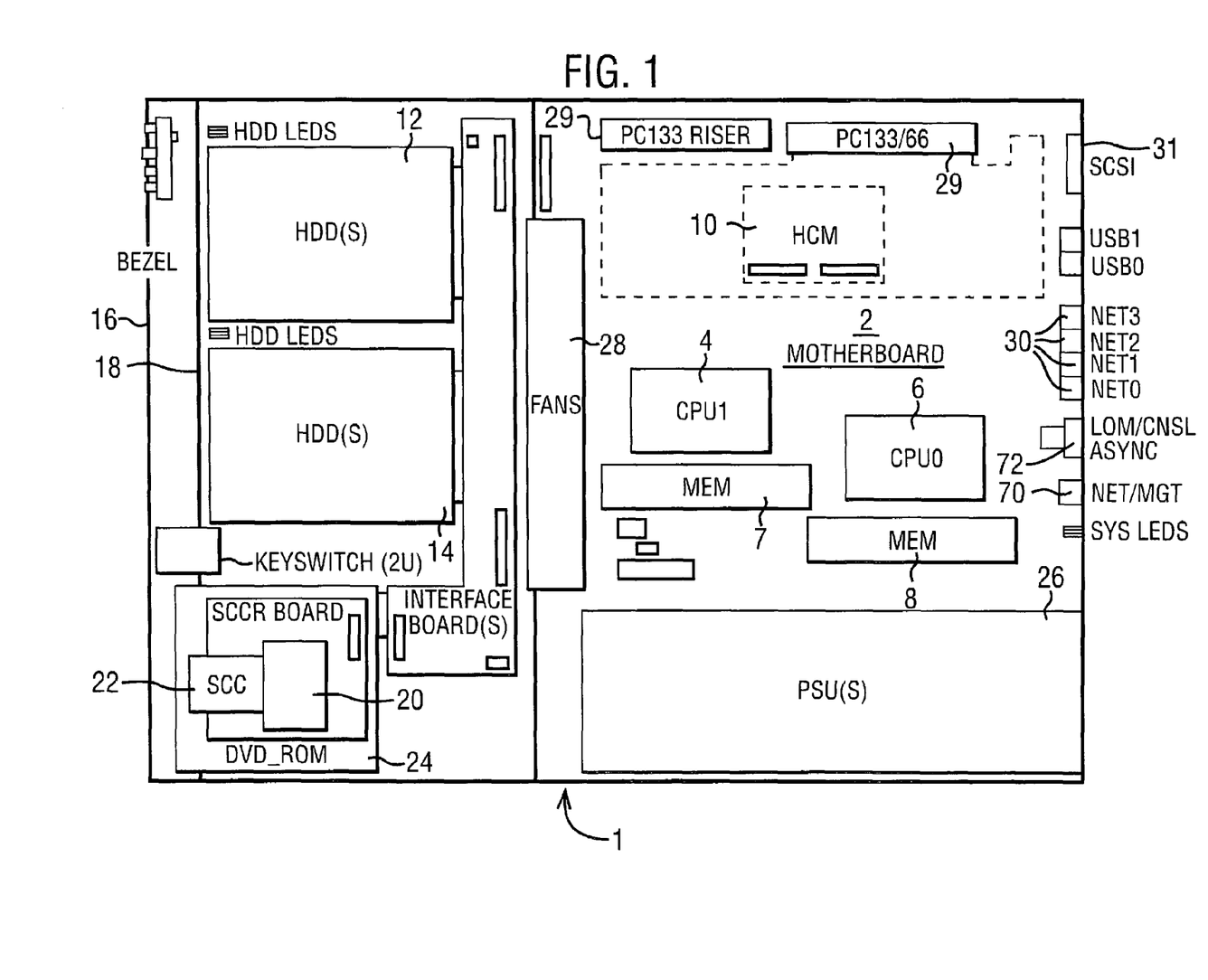
FIG. 1 is a physical plan view of one form of computer system according to the present invention.

Referring now to the drawings, in which like reference numerals are used to designate corresponding elements, FIG. 1 shows a physical plan view of a narrow form factor computer that is intended to provide a rack mounted server for use with the internet or as part of a local area network (LAN) or for other telecommunications purposes, and is designed to fit into, for example a nineteen inch rack electronics cabinet. Other sizes may alternatively be employed, for example to fit into 23 inch or metric racks. The assembly may be designed to be a so-called high "RAS" system, that is to say, to have high reliability, availability and serviceability. As such, it is intended that the system will be operated with the minimum amount of down time.

The computer comprises an enclosure 1 that contains a motherboard 2 in the form of a printed circuit board (PCB) designed in a custom form-factor to fit the enclosure 1 and chosen to minimise the cabling withing the enclosure. The motherboard 2 carries the majority of circuitry within the computer. On the motherboard are mounted one or more (in this case two) host processors or central processing units (CPUs) each of which is provided with its own dedicated cooling in the form of an impingement fan that clips onto the CPU socket. Each processor 4, 6 is provided with its own dedicated block of memory 7, 8, for example provided in the form of one or two banks of dual in-line memory modules (DIMMS) with a total of 256 MB to 16 GB block capacity although other forms and sizes may be used.

A hardware cryptographic module (HCM) 10 may also be located on the motherboard. The HCM may be provided on a mezzanine card which plugs directly into the motherboard, and contains a co-processor providing cryptographic protocol acceleration support for security algorithms used in private community applications.

Two hard disc drives (HDDS) 12 and 14 are located at the front of the computer behind the front bezel 16. The drives are hot-pluggable and are accessible by removal of the bezel and EMI shield 18. Two internal HDDs plug directly into the motherboard via right-angled connectors located on the front edge of the motherboard 2.

Next to the HDDs is arranged a system configuration card (SCCR) reader 20 that is able to read a system configuration card (SCC) 22 inserted therein. The SCC contains all relevant information concerning the computer, so that it is possible to replace one computer with another simply by inserting the original SCC into the new computer and replacing the hard disc drives with those of the original computer.

A removable media drive bay is provided to allow optional fitting of a slimline (notebook style) digital video disc or digital versatile disc (DVD) drive 24 for reading CD and DVD media. The media transport loader is accessible through a slot in the enclosure bezel 16.

One or two 320W or 400W custom power supply units (PSUs) 26 are also provided. In addition to the dedicated CPU fans, the assembly is cooled by means of a row of fans 28 mounted between the motherboard and the media drive bays.

The computer supports input/output (I/O) expansion by means of peripheral component interconnect (PCI) cards that plug into expansion slots. These are accommodated by means of riser cards 29 that plug directly into the motherboard 2.

A number of I/O interfaces and sockets 30 are provided along the rear surface of the enclosure 1 including four ethernet ports 30, a network management ethernet port 70, and a serial port 72. The network management ethernet port 70 and the serial port 72 allow user access to the service processor and system console.

Figure 2:
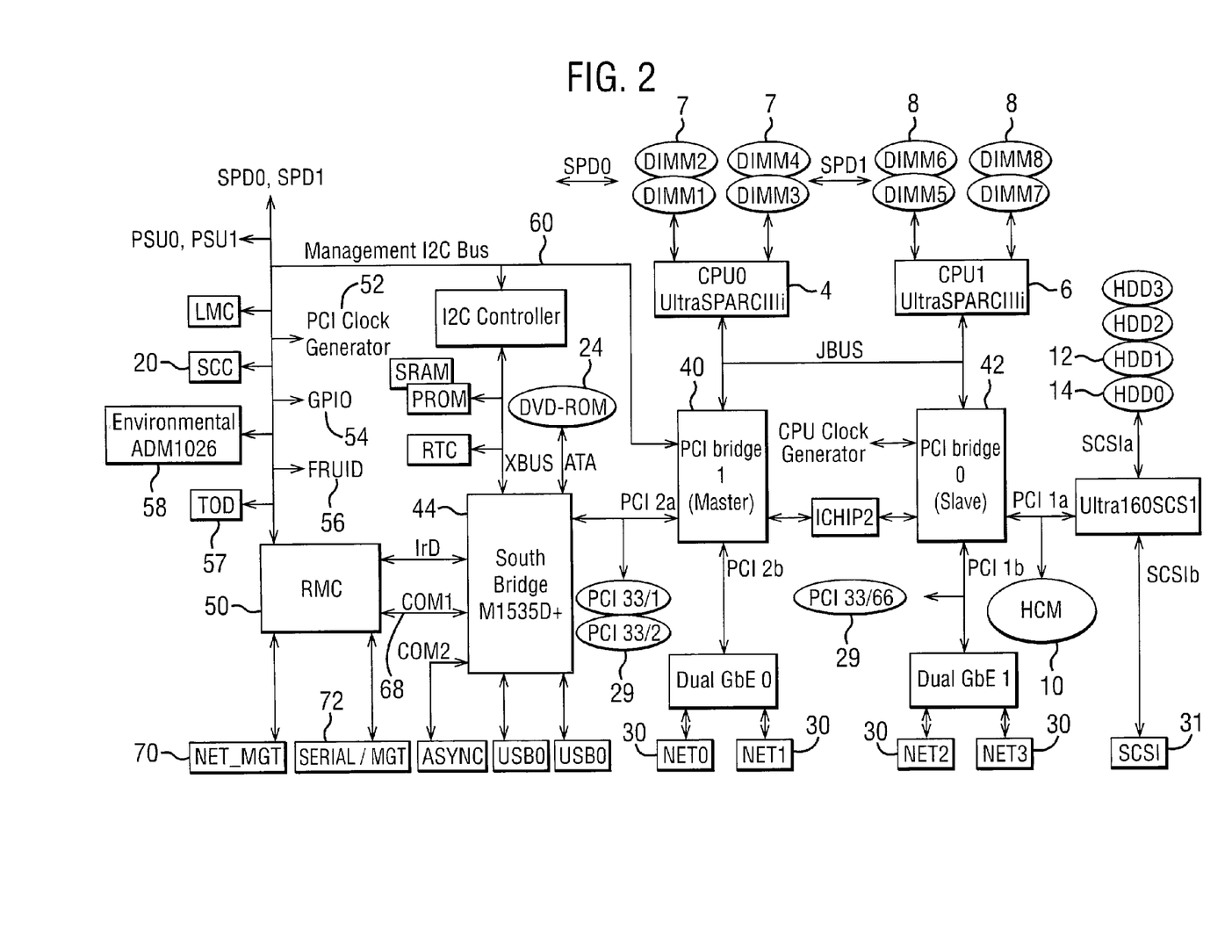
FIG. 2 is a schematic block diagram showing the system architecture of the system of FIG. 1.

FIG. 2 is a schematic representation of the system architecture of the computer system according to the invention.

Two host processors or CPUs 4 and 6 available from Sun Microsystems under the name UltraSPARCIIIi have an integer execution unit, a floating point and graphics unit, 32 kB level 1 instruction cache, 64 kB level 1 data cache, 1 MB (256 k×32) level 2 data cache, a memory controller with error correction code (ECC) and an interface controller for the processor bus. Four DIMM sockets 7 and 8 are associated with each CPU.

The CPUs 4, 6 are connected to two PCI bridge 40, 42 which provide interfaces to independent 64 bit PCI buses leading to various peripheral components such as the riser cards 28, HDDs 12 and 14, the HCM 10 etc. The PCI bridge 40 is also connected to a PCI I/O device 44 available from Acer Labs under the code M1535D+ also referred to as "South Bridge". This is an integrated PCI sub system which provides an integrated drive electronics (IDE) controller, a universal serial bus (USB) controller, independent universal asynchronous receiver/transmitters (UARTS), XBUS bridge and a power management controller. The PCI I/O device 44 also provides the console interface for enabling user access to the host processors 4 and 6.

A service processor or remote management controller (RMC) 50 is included for providing local and remote management services for control of the server including environmental monitoring, enclosure management and event logging. The service processor is also responsible for monitoring and reporting the operational status of the system. The processor operates from the +5V rail and is capable of power cycling and resetting of the host system. It is based on an MPC850 PowerPC design with dedicated flash ROM 62 and synchronous dynamic RAM (SDRAM) 64.

Figure 3:
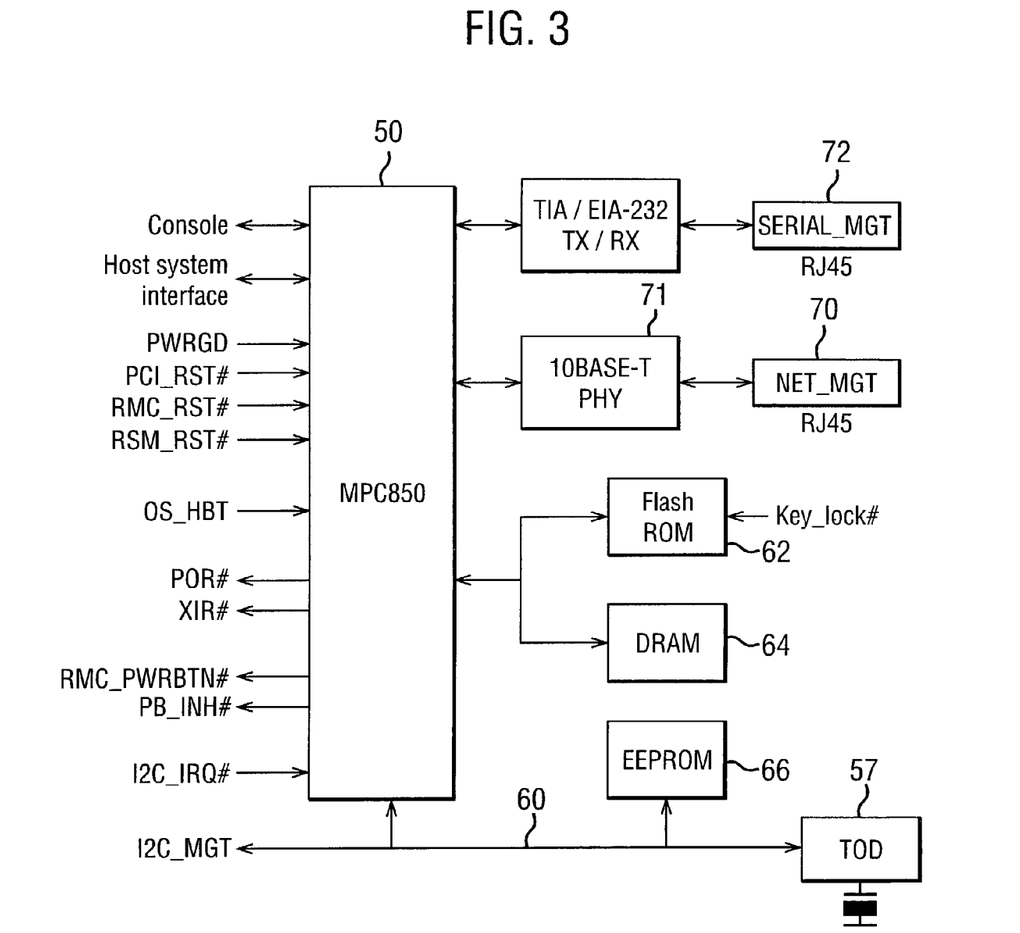
FIG. 3 is a schematic diagram showing the service processor employed in the present invention together with some peripheral components.

Peripheral devices that are required for the management functions, include the system configuration card reader (SCCR) 20, PCI clock generator 52, general purpose IO (GPIO) devices 54 field replaceable unit identification (FRUID) devices 56, a "time-of-day" real time clock 57, and a system temperature monitor 58 provided as an Analogue Devices ADM1026 IC. These devices are provided on an inter-integrated circuit (I2C) management bus 60. As shown in FIG. 3, in addition to the flash ROM and SDRAM, the service controller can access electrically erasable programmable ROM (EEPROM) 66 that is provided in the temperature monitor 58 via the I2C management bus 60.

As well as monitoring the environment and managing the peripheral devices, the service processor can communicate with the PCI I/O device or console interface 44 by means of line 68. User access to the service processor 50 is available either through the 10BASE-T ethernet port 70, NET_MGT, or through the asynchronous serial port 72 (SERIAL_MGT). In this way, remote user access is available either to the service processor 50 for management functions, or to the host processor(s) 4 and 6 via the service processor 50.

Figure 4:
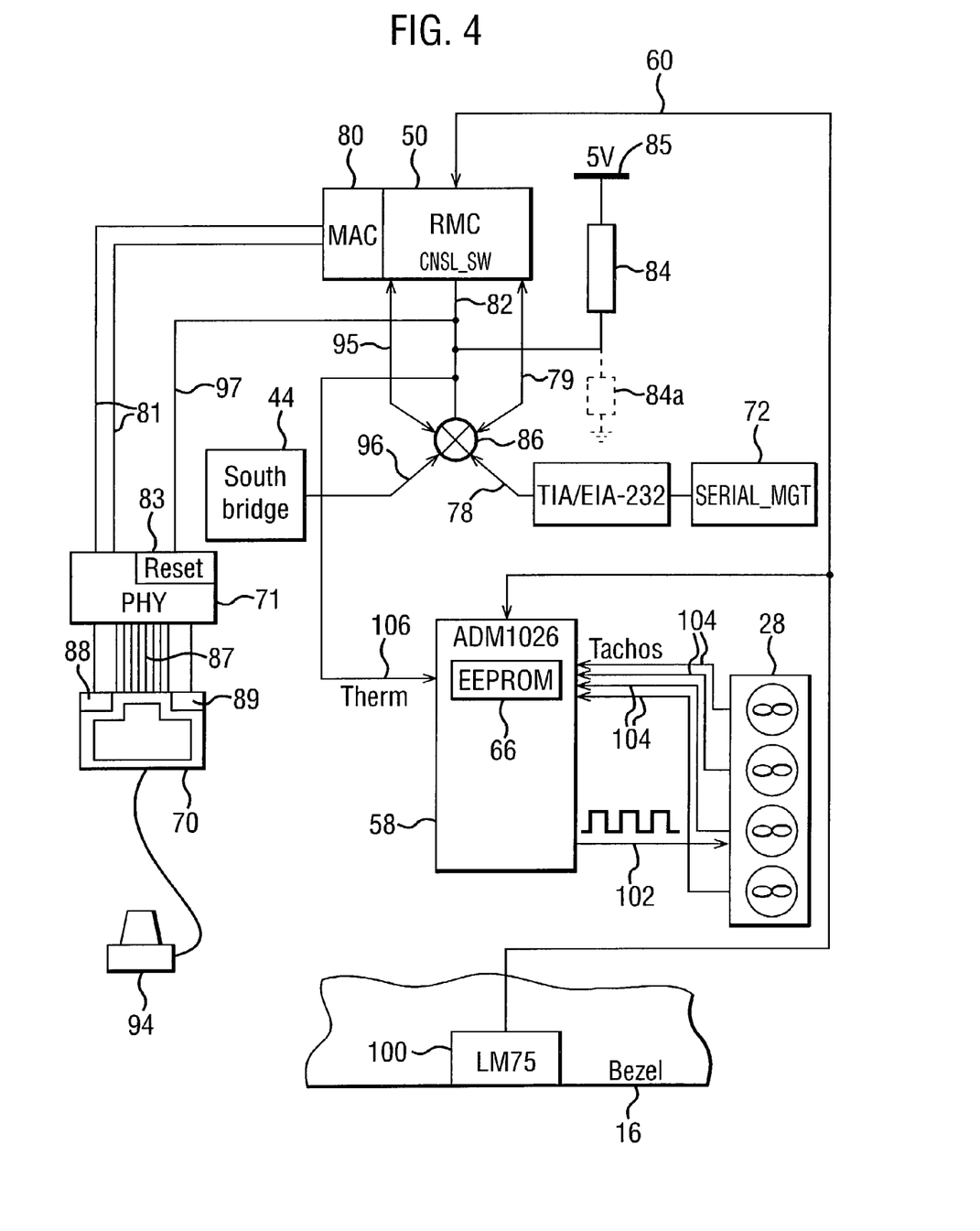
FIG. 4 is a schematic diagram showing the service processor and the interconnection to certain peripheral components.
Figure 6:
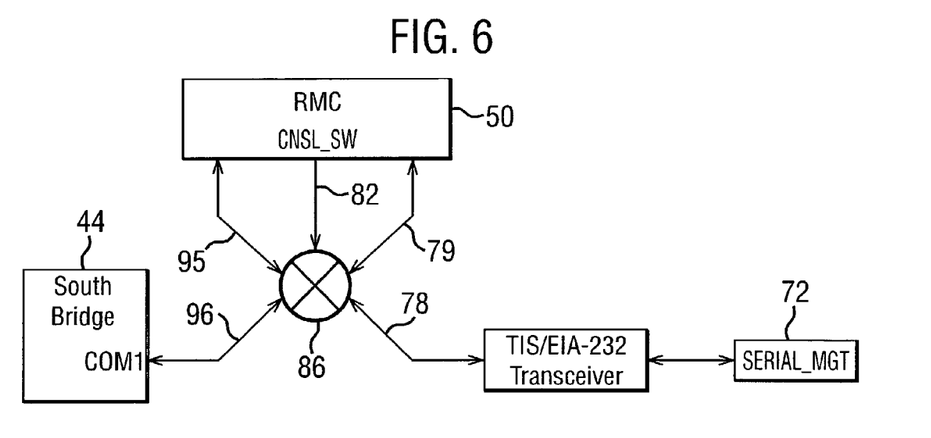
FIG. 6 is a schematic diagram showing the service processor, the console interface, user interface and multiplexer without other peripheral components shown in FIG. 4.

FIG. 4 shows the service processor 50 connected to various peripheral components, and FIG. 6 shows the communication between the service processor 50 and the console interface 44 and serial port 72. As shown in FIG. 6, communication between the serial port 72 and the service processor 50 occurs via a multiplexer or other switching device 86. The multiplexer 86 is controlled by a signal CNSL_SW from the service processor 50 along a control line 82 so that, when the voltage on the control line is low (ground) all signals to and from the serial port 72 along line 78 are routed through the service processor 50 along line 79. On receipt of the signal from the serial port 72, the service processor 50 determines whether the signal is a management mode command, in which case it is acted upon by the service processor, or whether it is a console mode command, in which case the service processor routes the signal to the console interface 44 via line 95, the switching device or multiplexer 86 and line 96.

If, however, any malfunction occurs in the service processor 50, accessing the console interface 44 will not be possible. In this case, control line 82 is arranged so that its voltage will rise to the appropriate rail voltage (approximately 5V) and disconnect the lines 78 and 96 from lines 79 and 95 respectively. At the same time multiplexer 86 connects line 78 directly to line 96 so that signals are transmitted directly between the serial port 72 and the console interface 44, thereby enabling the user to access the console interface 44 on failure of the service processor.

One simple way to execute such a switch is to provide a pull-up resistor 84 between the voltage rail and the line 82, so that, if the service processor is not operational to bring the line to ground, the pull-up resistor will cause its voltage to rise to the positive voltage rail value. The lines 78 and 96 may be connected by a switch, that will normally be open, but will close when the voltage on the control line 82 rises. The lines 78 and 79, and the lines 95 and 96 may also be connected by switches that open as the control line voltage rises. Such an arrangement may be realised in a number of ways, for example by means of a CMOS analogue or digital multiplexer 86 in which the control line is applied to the gates of the FET switches in the multiplexer (via inverters where necessary).

As an alternative to the pull-up resistor 84, a pull-down resistor 84*a* as shown in FIG. 4 may be employed that is connected between the control line 82 and earth. In this case the service processor 50 would hold the control line 82 at same voltage level unless it failed in which case the control line voltage would fall to earth potential.

Figure 7:
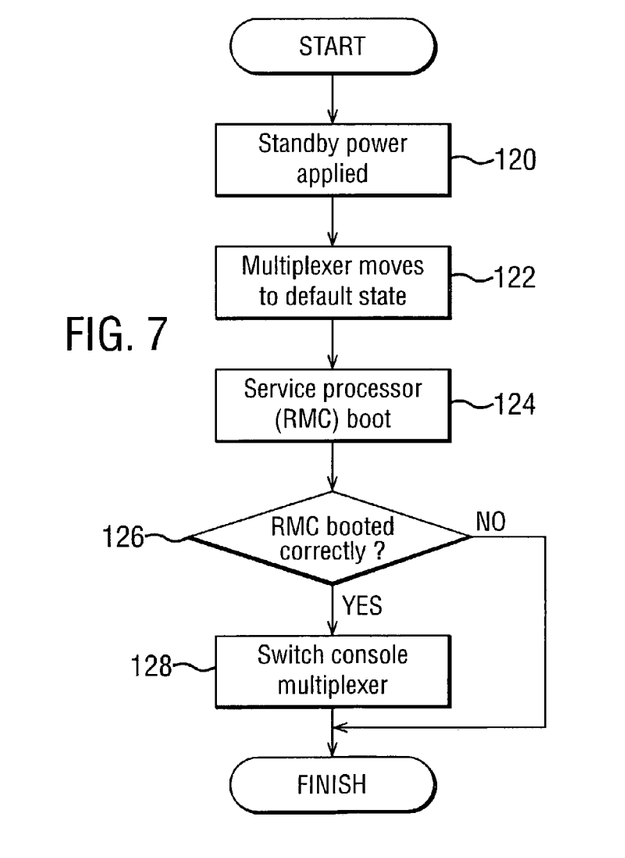
FIG. 7 is a flow diagram of a system power-up.

FIG. 7 is a flow diagram showing the power-up procedure of a computer system according to the invention, which may form part of the power on self test (POST) procedure. When the server cable is first plugged in to the system, the multiplexer 86 will be in an undefined condition. On plugging the server cable standby power will be applied, (step 120) whereupon the control line 82 voltage will fall to earth, and the multiplexer 82 will move to its default condition in which lines 78 and 96 are connected and the service processor is bypassed (step 122). The service processor (50) then attempts to boot up (step 124) and an interrogation (step 126) occurs as to whether the boot-up has been successful. If this attempt fails, due to a malfunction of the service processor, the system will operate without the service processor, (and without any of its management functions), but the service processor will be bypassed, and access to the console interface will be available. If the service processor booting operation is successful, the console multiplexer 74 will be switched on (step 128), and console commands and data will be routed via the service processor, and will continue to be so until the system is powered down or the service processor fails.

Figure 5:
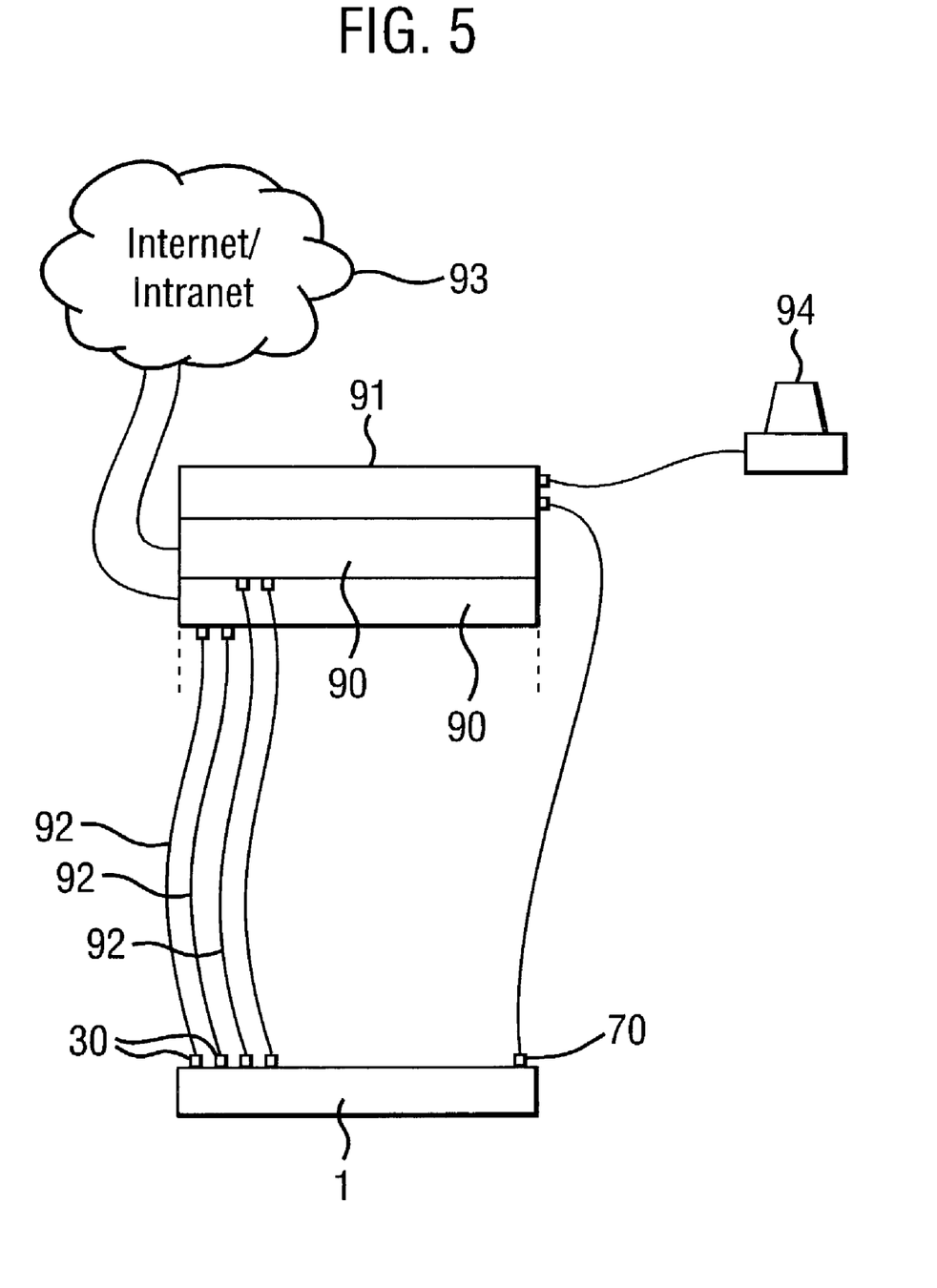
FIG. 5 is a schematic diagram showing connection of the computer system to a network.

As shown in FIG. 4, the service processor 50 also controls the ethernet port 70 which is connected to the system administrator 94. In fact, as shown in FIG. 5, the server is connected to the network administrator via a further server 91 or switch. The computer is also connected to servers 90 as part of a network 93. If the service processor 50 malfunctions, it is possible for interference on lines 31 leading to the ethernet port 70 generated by, for example, the host processor(s) 4, 6, to be sent to the network. In order to prevent this the control line 82 is connected to the reset input 83 of the physical interface 71 for the ethernet port 70 so that, on failure of the service processor 50, the ethernet port 70 is quiesced and the network administrator 94 becomes aware of the fault.

In addition, the control line 82 is connected to the thermal input of the temperature monitor 58. Under normal operation the temperature monitor will send pulse width modulated fan speed signals to the fans 28 along line 102 under command of the service processor 50. When the service processor fails and the voltage on the control line 82 rises, this voltage is also fed into the thermal reset input 106 of the temperature monitor and the enclosure fans 28 are then driven at full speed.

In this way, should a malfunction of the service processor occur, the system ensures that no noise is transferred to the network, that the system is adequately cooled and that communication to the host processor(s) is still possible.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims can be formulated to such features during prosecution of this application or of any such further application derived therefrom. In particular, with reference to the appended claims, features from dependent claims can be combined with those of the independent claims and features from respective independent claims can be combined in any appropriate manner and not merely in the specific combinations enumerated in the claims.

The invention claimed is:

1. A computer system which comprises:
   (i) a host processor;
   (ii) a service processor configured to provide system management functions within the computer system, the service processor being responsive to external mode switching commands to operate either in a management mode in which commands received are processed by the service processor, or in a console mode in which commands received are passed by the service processor to a console interface for processing by the host processor;
   (iii) a user interface configured to receive external commands and data for the service processor and/or the host processor, and configured to send data from the service processor and/or the host processor; and
   (iv) a device configured to route the commands and data to and from the user interface via the service processor only when the device receives a signal from the service processor so that, in the absence of the signal, the commands and data are sent between the user interface and the console interface bypassing the service processor.

2. A system as claimed in claim 1, wherein the device is a signal multiplexer.

3. A system as claimed in claim 1, wherein the device is controlled by a voltage level that is supplied by the service processor and a pull-up or pull-down resistor, so that the device will cause commands and data to bypass the service processor if the device receives a voltage governed by the pull-up or pull-down resistor.

4. A system as claimed in claim 3, wherein the device includes a bus that extends between the user interface and the console interface, the bus including a FET whose gate is connected to a voltage level output of the service processor and to a pull-up resistor.

5. A system as claimed in claim 1, which includes a program that is executable on powering the system up, the program including:
   1) code configured to cause the routing device to bypass the service processor; and
   2) code configured to boot the service processor.

6. A system as claimed in claim 5, wherein the program includes code configured to cause the service processor to send the signal to the device once the service processor is booted.

7. A system as claimed in claim 1, which includes code configured to cause the service processor to implement internal switching between the management and console modes.

8. A system as claimed in claim 1, wherein the service processor includes memory configured to accept data from the console interface when the service processor is in management mode.

9. A system as claimed in claim 8, wherein the memory comprises dynamic RAM.

10. A system as claimed in claim 8, which includes further memory outside the service processor that holds application specific information relating to the system management functions.

11. A system as claimed in claim 10, wherein the further memory comprises an electrically erasable programmable read only memory.

12. A system as claimed in claim 1, wherein the device is connected to the user interface via a port transceiver.

13. A system as claimed in claim 1, wherein the service processor provides one or more of the following system functions:
   1) power management control,
   2) environmental monitoring,
   3) enclosure management and event logging
   4) fan control,
   5) voltage rail monitoring, and
   6) system status monitoring.

14. A system as claimed in claim 1, which is a computer server.

15. A sub-assembly for a computer system, the subassembly comprising:
   (i) a service processor configured to provide system management functions within the computer system, the service processor being responsive to external mode switching commands to operate either in a management mode in which commands received are processed by the service processor, or in a console mode in which commands received are passed by the service processor to a console interface for processing by a host processor of the system;
   (ii) a user interface configured to receive external commands and data for the service processor and/or the host processor, and configured to send data from the service processor and/or the host processor; and
   (iii) a device configured to route the commands and data to and from the user interface via the service processor only when the device receives a signal from the service processor so that, in the absence of the signal, the commands and data are sent between the user interface and the console interface bypassing the service processor.

16. A sub-assembly as claimed in claim 15, which includes code configured to cause the service processor to implement internal switching between the management and console modes.

17. A method of operating a computer system that includes a host processor and a service processor configured to provide system management functions, the method comprising sending external commands to the service processor and receiving data from the service processor via a user interface, the service processor being responsive to external mode switching commands to operate either in a management mode in which commands received are processed by the service processor, or in a console mode in which commands received are passed by the service processor to a console interface for processing by the host processor;

wherein the commands and data are routed to and from the user interface via the service processor only on receipt of a signal from the service processor so that, in the absence of the signal, the commands and data are sent between the user interface and the console interface bypassing the service processor.

18. A sub-assembly as claimed in claim 15, which includes a program that is executable on powering the system up, the program including:
   1) code configured to cause the routing device to bypass the service processor; and
   2) code configured to boot the service processor.

19. A sub-assembly as claimed in claim 18, wherein the program includes code configured to cause the service processor to send the signal to the device once the service processor is booted.

20. A sub-assembly as claimed in claim 15, wherein the service processor includes memory configured to accept data from the console interface when the service processor is in management mode.

* * * * *